US012342918B2

(12) United States Patent
Lee et al.

(10) Patent No.: US 12,342,918 B2
(45) Date of Patent: Jul. 1, 2025

(54) PORTABLE HAIR PRINTER AND PRINTING METHOD USING SAME

(71) Applicant: PRINKER KOREA INC., Suwon-si (KR)

(72) Inventors: Jong In Lee, Suwon-si (KR); Kyu Suk Lee, Suwon-si (KR); Tae Sik Yun, Seoul (KR)

(73) Assignee: PRINKER KOREA INC., Suwon-si (KR)

( * ) Notice: Subject to any disclaimer, the term of this patent is extended or adjusted under 35 U.S.C. 154(b) by 135 days.

(21) Appl. No.: 18/494,723

(22) Filed: Oct. 25, 2023

(65) Prior Publication Data

US 2024/0074558 A1 Mar. 7, 2024

Related U.S. Application Data

(63) Continuation-in-part of application No. 16/978,357, filed as application No. PCT/KR2019/002584 on Mar. 6, 2019, now Pat. No. 11,839,283.

(30) Foreign Application Priority Data

Mar. 7, 2018 (KR) ........................ 10-2018-0027049

(51) Int. Cl.
*A45D 19/00* (2006.01)
*B41J 11/00* (2006.01)

(52) U.S. Cl.
CPC ....... *A45D 19/0075* (2021.01); *A45D 19/012* (2021.01); *B41J 11/0095* (2013.01)

(58) Field of Classification Search
CPC ............... A45D 19/0075; A45D 19/012; B41J 11/0095; B41J 3/407; B41J 3/4078
See application file for complete search history.

(56) References Cited

U.S. PATENT DOCUMENTS

2004/0078278 A1* 4/2004 Dauga .................. A45D 44/005 434/100
2011/0129283 A1 6/2011 Samain
(Continued)

FOREIGN PATENT DOCUMENTS

CN 1625220 6/2005
CN 1728956 2/2006
(Continued)

OTHER PUBLICATIONS

European Search Report—European Application No. 19764317.4 issued on Oct. 27, 2021, citing US 2004/0078278, US 2011/0162673, US 2017/0056303, EP 2326204, US 2011/0129283, EP 3680849, and US 2016/0183664.
(Continued)

*Primary Examiner* — Bradley W Thies
(74) *Attorney, Agent, or Firm* — CANTOR COLBURN LLP

(57) ABSTRACT

A portable hair printer includes a communication module, a printer module that performs a printing operation, a memory that stores a program for printing an image on a surface of a bundle of hairs, and a processor that executes the program, wherein the program is executed by the processor, receives an image to be dyed on the bundle of hairs from the user terminal through the communication module, and transmits the received image to the printer module to perform an image printing operation for the bundle of hairs, and the portable hair printer further comprises a housing having the communication module, the printer module, the memory, and the processor embedded therein, and the housing includes an upper housing and a lower housing hinged to each other around a hinge.

21 Claims, 9 Drawing Sheets

(56) References Cited

U.S. PATENT DOCUMENTS

| | | | |
|---|---|---|---|
| 2011/0162673 A1 | 7/2011 | Samain et al. |
| 2016/0183664 A1 | 6/2016 | Grez |
| 2017/0018093 A1 | 1/2017 | Kang et al. |
| 2017/0056303 A1 | 3/2017 | Rabe et al. |

FOREIGN PATENT DOCUMENTS

| | | |
|---|---|---|
| CN | 106061316 | 10/2016 |
| CN | 206197316 | 5/2017 |
| CN | 107625268 | 1/2018 |
| EP | 3680849 | 7/2020 |
| FR | 2810761 | 12/2001 |
| JP | 2001195568 | 7/2001 |
| JP | 2003266734 | 9/2003 |
| JP | 2006503610 | 2/2006 |
| JP | 2012146182 | 8/2012 |
| JP | 2014233944 | 12/2014 |
| JP | 2017504403 | 2/2017 |
| KR | 20060036802 | 5/2006 |
| KR | 200419894 | 6/2006 |
| KR | 101254540 | 4/2013 |
| KR | 101456942 | 11/2014 |
| KR | 20170009261 | 1/2017 |
| KR | 20170101957 | 9/2017 |
| KR | 101783314 | 10/2017 |
| WO | 2010004526 | 1/2010 |

OTHER PUBLICATIONS

International Search Report—PCT/KR2019/002584 dated Jun. 17, 2019.

* cited by examiner

PORTABLE HAIR PRINTER AND PRINTING METHOD USING SAME

BACKGROUND OF THE INVENTION

1. Field of the Invention

The present disclosure relates to a portable hair printer and a hair printing method using the same.

2. Description of the Related Art

Generally, a hair dye is divided into a temporary hair dye and a permanent hair dye depending on properties. The temporary hair dye is attached to surfaces of hairs to physically dye. The temporary hair dye is mainly used to cover prematurely gray hairs or to color the hairs, and there are various formulations such as sticks, gels, sprays, and mousses, and various products, such as color sticks, color sprays, color gels, color mousses, and color mascara are released.

In particular, a hair dye and an oxidizing agent mixed together are used as the permanent hair dye to dye hairs, and the hair dye and the oxidizing agent are stored in separate containers, and certain amounts thereof are mixed together when dyeing hairs.

However, there is inconvenience in handling of storing and maintaining the hair dye and the oxidizing agent in their respective containers, and there is inconvenience of mixing the hair dye and the oxidizing agent in a certain proportion when dyeing hairs. In addition, the hair dye once mixed to be used is not reusable due to oxidation, and when applied to hairs, the hair dye is applied to the scalp thickly or to the skin, and thus, there is a problem that causes side effects such as skin allergies to people with weak skin.

In this regard, Korean Patent Registration No. 10-1254540 (title of the disclosure: HAIR DYEING MACHINE) discloses a hair dyeing machine which a hair dye and an oxidizing agent are each squeezed into a dye supply portion, and a hair dye and an oxidizing agent can be mixed and ejected through a dye comb when dyeing hair.

In this way, hair dye manufacturing companies launch new products that are convenient to use and reduce dyeing time but does not launch products with a significant improvement.

SUMMARY OF THE INVENTION

The present invention is to solve the problems described above of the related art, and the present disclosure provides a portable hair printer that may dye hairs with an image of a design desired by a user, and a hair printing method using the same.

As technical means for solving the technical problem described above, a portable hair printer according to an embodiment of the present disclosure includes a communication module, a printer module that performs a printing operation, a memory that stores a program for printing an image on a surface of a bundle of hairs, and a processor that executes the program, wherein the program is executed by the processor, receives an image to be dyed on the bundle of hairs from the user terminal through the communication module, and transmits the received image to the printer module to perform an image printing operation for the bundle of hairs, and the portable hair printer further includes a housing having the communication module, the printer module, the memory, and the processor embedded therein, and the housing includes an upper housing and a lower housing hinged to each other around a hinge, and a printer head of the printer module is exposed at one end of the upper housing, and the bundle of hairs is gripped between the upper housing and the lower housing as the upper housing and the lower housing approach each other.

According to another embodiment of the present invention, a hair printing method according to another embodiment of the present disclosure includes receiving an image to be dyed on a bundle of hairs from a user terminal through a communication module by using the portable hair printer, and transmitting the received image to a printer module included in the portable hair printer to perform an image printing operation for the bundle of hairs, and the received image is converted in size by the user terminal to correspond to the length of the bundle of hairs, based on the length of the bundle of hairs.

According to the problem solving means of the present invention described above, a portable hair printer may quickly and easily dye various images for expressing personality of a user on hairs of the user.

In addition, the portable hair printer performs an image printing operation as the portable hair printer moves along hairs while the hairs are gripped by the portable hair printer, and thus, it is possible to dramatically reduce time for dyeing a sophisticated image.

DETAILED DESCRIPTION OF THE EMBODIMENT

Figure 1:
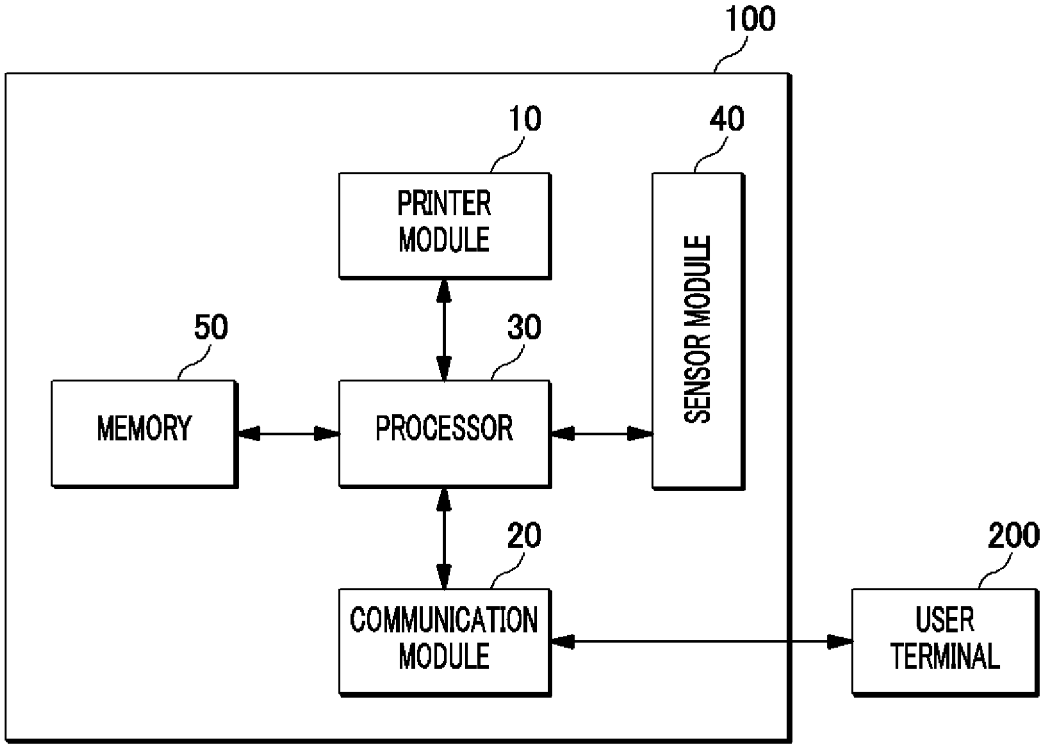
FIG. 1 is a block diagram illustrating a schematic configuration of a portable hair printer according to an embodiment of the present disclosure.

Hereinafter, embodiments of the present disclosure will be described in detail with reference to the accompanying drawings such that those skilled in the art to which the present disclosure belongs may easily implement. However, the present disclosure may be implemented in many different forms and is not limited to the embodiments described herein. In addition, in order to clearly describe the present disclosure in the drawings, parts irrelevant to the description are omitted, and like reference numerals are assigned to like parts throughout the specification.

Throughout the specification, when it is described that a part is "connected" to the other part, this includes not only a case in which the part is "directly connected" to the other part, but also a case in which the part is "electrically connected" to the other part through another element. In addition, when it is described that a part "includes" a configuration element, this means that the configuration element may further include other components, not to exclude other components, unless otherwise stated, and it should be understood that existence or addition possibilities of one or more other features, numbers, steps, operations, configuration elements, components, or combinations thereof are not excluded in advance.

FIG. 1 is a block diagram illustrating a schematic configuration of a portable hair printer according to an embodiment of the present disclosure.

Referring to FIG. 1, a portable hair printer 100 according to an embodiment of the present disclosure includes a communication module 20, a printer module 10 that performs a printing operation, a memory 50 in which a program for printing an image on a surface of a hair is stored, and a processor 30 that executes the program. The program may be executed by the processor 30, receive an image to be dyed on the hair from a user terminal 200 through the communication module 20, and transmit the received image to the printer module 10, thus, an image printing operation for the hair may be performed.

Meanwhile, the memory 50 includes a non-volatile storage device that keeps stored information even when power is not supplied and a volatile storage device that requires power to keep the stored information.

In addition, the present disclosure further includes a sensor module 40 for detecting a movement state on the hair of the hair printer 100, and a program may adjust an output state of an image in synchronization with information on the movement state on the hair of the hair printer 100. Specifically, the sensor module 40 may measure information on a movement speed on the hair or a movement distance from an image printing start point. For example, the sensor module 40 may be configured by an optical sensor or a rotation roller disposed at a position adjacent to a printer head of an upper housing of the hair printer 100, and detailed description thereof will be made below.

Figure 2:
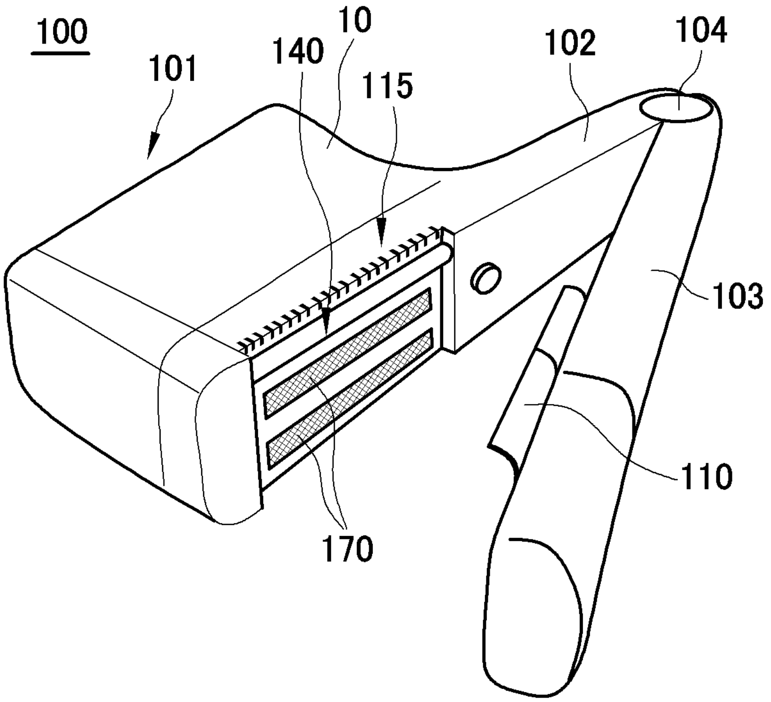
FIG. 2 is a perspective view illustrating an upper housing of the portable hair printer according to the embodiment of the present disclosure.

FIG. 2 is a perspective view illustrating the upper housing of the portable hair printer according to the embodiment of the present disclosure.

Figure 3:
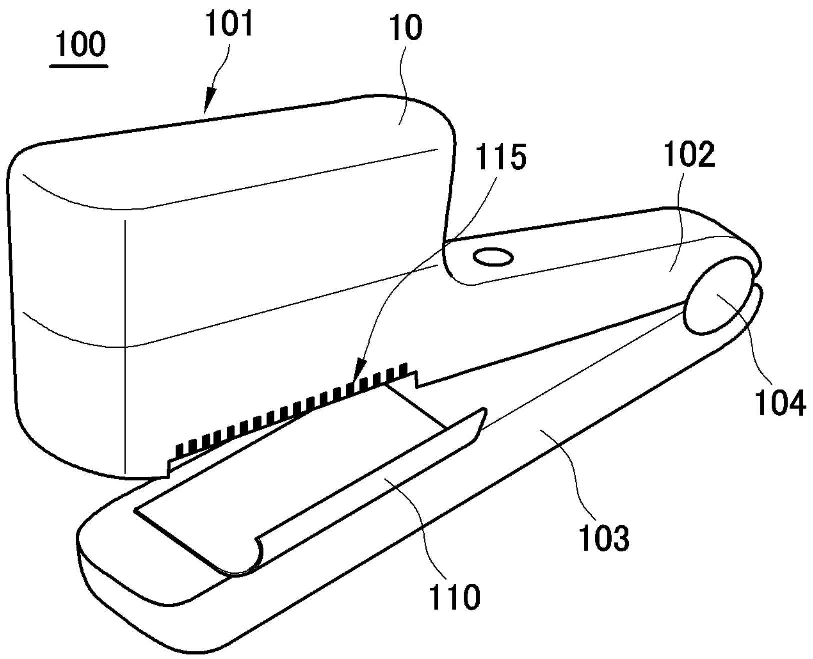
FIG. 3 is a perspective view illustrating a lower housing of the portable hair printer according to the embodiment of the present disclosure.

FIG. 3 is a perspective view illustrating a lower housing of the portable hair printer according to the embodiment of the present disclosure.

Figure 4:
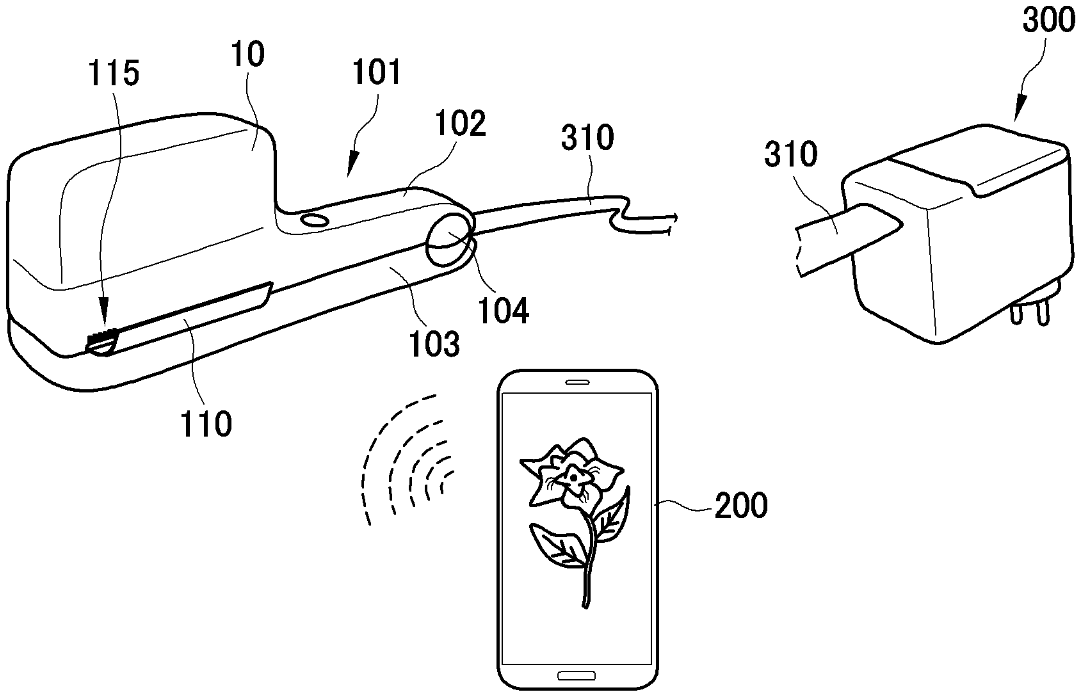
FIG. 4 is a view illustrating a configuration of the portable hair printer according to the embodiment of the present disclosure.

FIG. 4 is a view illustrating a configuration of the portable hair printer according to the embodiment of the present disclosure.

Figure 5:
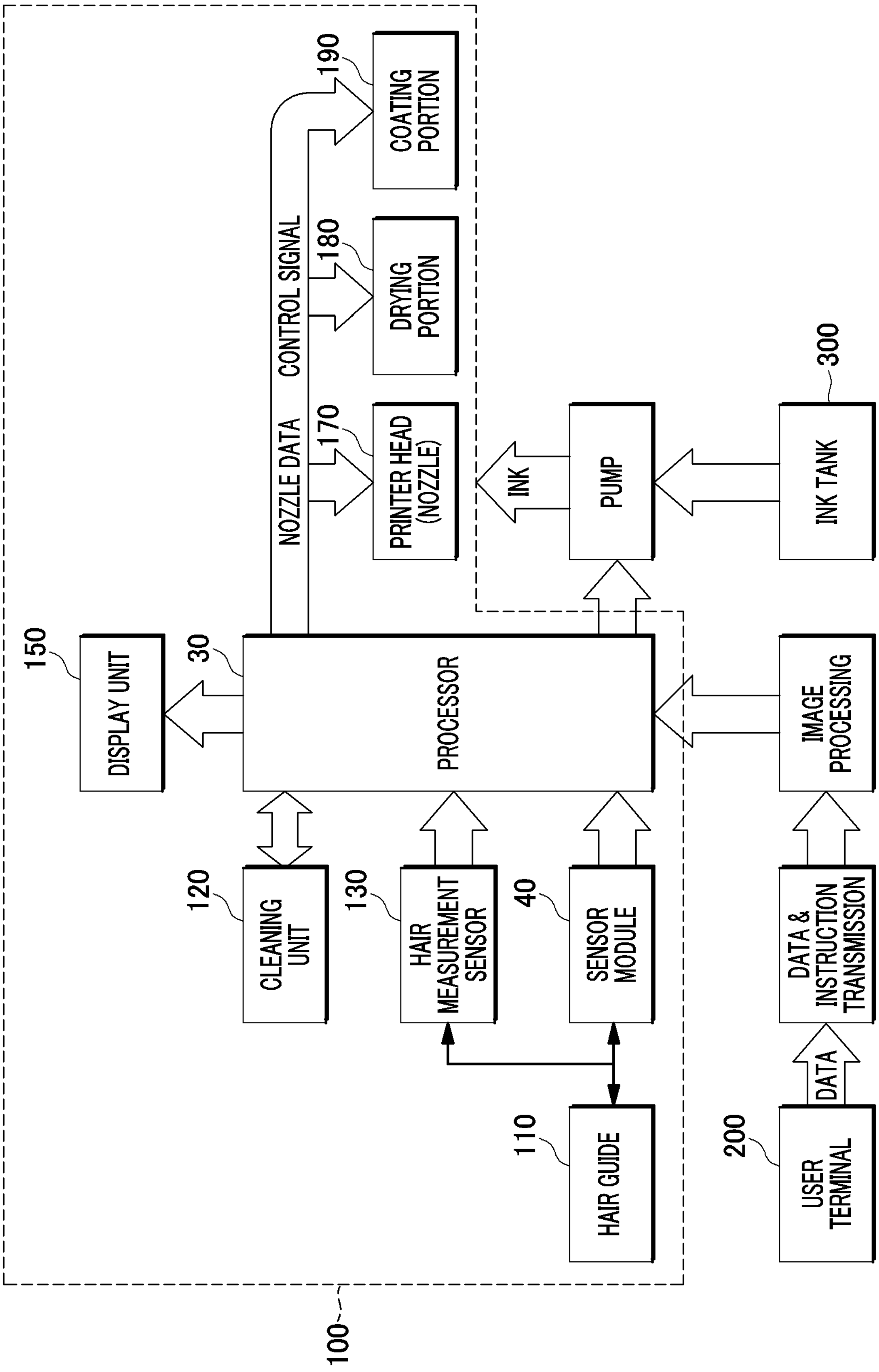
FIG. 5 is a diagram illustrating a detailed configuration of the portable hair printer according to the embodiment of the present disclosure.

FIG. 5 is a diagram illustrating a detailed configuration of the portable hair printer according to the embodiment of the present disclosure.

Specifically, the portable hair printer 100 according to the present disclosure further includes a housing 101 that houses the communication module 20, the printer module 10, the memory 50, and the processor 30. Here, the communication module 20 may support wireless communication or wired communication.

Referring to FIG. 2, the housing 101 includes an upper housing 102 and a lower housing 103 hinged to each other around a hinge 104, and the printer head 170 of the printer module 10 is exposed at one end of the upper housing 102, and as the upper housing 102 and the lower housing 103 approach each other, hairs may be gripped between the upper housing 102 and the lower housing 103.

Here, the printer head 170 ejects dyeing ink so as to correspond to a type and the amount of ejection of the dyeing ink determined according to print data. For example, the dyeing ink may be composed of four types of C, M, Y, and W. In addition, the dyeing ink may include a pigment or dye as a colorant and include a nonionic surfactant or an ionic surfactant.

The printer module 10 may be configured in a form in which a replaceable ink cartridge of a general printer is embedded in the upper housing 102.

Referring to FIGS. 2 and 5, the housing 101 of the portable hair printer 100 according to the present disclosure further includes a rotation roller 140, a hair guide 110, a comb member 115, and a display unit 150 for displaying an operation state of the hair printer 100, and the sensor module 40 and a hair measurement sensor 130 may be embedded therein.

That is, the sensor module 40 may detect a rotation speed of the rotation roller 140 coupled to the hair printer 100, may check a movement speed or a movement distance from a printing start point from this, and may adjust an image output state in synchronization with the movement speed or the movement distance.

As illustrated in FIG. 2, the rotation roller 140 may be disposed at a position adjacent to the printer head 170 of the upper housing 102 and rotate in a direction perpendicular to an extension direction of the upper housing 102, and the sensor module 40 may detect a rotation state of the rotation roller 140.

For example, the rotation roller 140 may disposed on one side of the printer head 170 provided on a lower surface of the upper housing 102 and may be formed to have a length corresponding to the printer head 170. In addition, the rotation roller 140 may be formed of a rubber material to have rotational friction when rolling over the hair and is not limited thereto.

For example, while a user grips hairs in a direction crossing a length direction of the hairs between the upper housing 102 and the lower housing 103, when the housing 101 of the hair printer 100 is slid from an upper side to a lower side of the hairs, the rotation roller 140 may rotate in a direction opposite to a movement direction of the housing 101.

At this time, the program executed by the processor 30 calculates a length of a bundle of hairs based on a value measured by the sensor module 40 as the portable hair printer 100 moves along the hairs while the hairs are gripped between the upper housing 102 and the lower housing 103 of the portable hair printer 100, and a value of the length of the bundle of hairs may be output through the display unit 150 coupled to the portable hair printer 100 or may be transmitted to the user terminal 200.

The sensor module 40 or an encoder may be used and may count the number of rotations of the rotation roller 140.

For example, the user terminal 200 may output a virtual screen whose image is converted in size to correspond to the length of bundle of hairs based on the calculated length of the bundle of hairs, and a user may select an image to be dyed while viewing the virtual screen. At this time, the image, which is selected by the user, is converted in size by the user terminal 200 to correspond to the length of the bundle of hairs and may be transmitted to the portable hair printer 100. Due to this, the portable hair printer 100 may obtain an optimal resolution of the dye image regardless of the length of the bundle of hairs of different users.

The hair measurement sensor 130 may measure a size of a bundle of hairs gripped between the upper housing 102 and the lower housing 103. For example, the hair measurement sensor 130 may be configured as a thickness measurement sensor that measures a thickness of the hair while the hair is gripped between the upper housing 102 and the lower housing 103, and for example, the thickness measurement sensor may be a distance sensor for measuring a distance between the upper housing 102 and the lower housing 103 or may be a pressure sensor for measuring a pressure applied to the upper housing 102 or the lower housing 103 by the hair. For example, the distance sensor may be composed of an infrared sensor or an ultrasonic sensor and is not limited thereto.

At this time, when a size of a bundle of hairs measured by the hair measurement sensor 130 is greater than or equal to a threshold, the program executed by the processor 30 may output an alarm to cause the hairs to be gripped again. Due to this, the upper housing 102 and the lower housing 103 may obtain an appropriate thickness of the hairs such that a high-quality image is printed.

Referring to FIGS. 2 and 3 again, the hair guide 110 may be disposed on a side surface of the lower housing 103 in an extension direction of the lower housing 103 in a region corresponding to the printer head 170 of the upper housing 102 to guide introduction of the hairs.

For example, the hair guide 110 may be formed to extend in a curved shape toward an upper side from the side surface of the lower housing 103. In addition, the hair guide 110 may be formed of a steel material and is not limited thereto.

The comb member 115 may disposed on the side surface of the upper housing 102 in an extension direction of the upper housing 102 in a region corresponding to the printer head 170 of the upper housing 102 to guide hairs to be evenly introduced. For example, the comb member 115 allows hairs to evenly spread through teeth of a comb, thus, preventing the hairs from getting tangled.

That is, the hair guide 110 and the comb member serve to fix hairs such that a certain size of a bundle of hairs is gripped between the upper housing 102 and the lower housing 103.

Meanwhile, the comb member 115 may be selectively attached or detached to or from one side of the upper housing 102 through a fastening member. In addition, various types of comb member 115 may be provided in the form of accessories, and an appropriate comb member 115 may be combined according to a user's selection. User convenience can be improved by allowing the appropriate comb member 115 to be replaced depending on the user's hair length, hair texture, hair style, and so on.

Referring to FIG. 4, the hair printer 100 according to the present disclosure further includes an ink tank 300 for supplying dyeing ink to the printer module 10, and a tube 310 for transmitting ink of the ink tank 300 to the printer module 10. In addition, in the hair printer 100, the ink tank 300 for supplying dyeing ink to the printer module 10 may be included in the upper housing 102.

As an example, as illustrated in FIG. 4, the ink tank 300 may be configured separately from the hair printer 100 to supply dyeing ink to the printer module 10 through the tube 310 and is not limited thereto. As another example, the ink tank 300 may be configured to be embedded in the upper housing 102, and may be integrally formed with the upper housing 102 to supply dyeing ink to the printer head 170 through the tube 310 or may be formed to be separable from the upper housing 102 to supply dyeing ink to the printer head 170 by coming into contact therewith.

For example, the ink tank 300 may supply dyeing ink to the printer module 10 through an electric pump. The tube 310 serves as a path for transmitting dyeing ink, and the tube 310 that connects the ink tank 300 to the printer module 10 may be provided together with a power supply cable.

Referring to FIG. 5, the hair printer 100 according to the present disclosure further includes, a coating portion 190 for outputting a coating agent before and after the dyeing ink is ejected and a drying portion 180 for drying dyeing ink or the coating agent, which are disposed adjacent to the printer head 170 of the upper housing 102. In this case, a form in which the coating agent is output includes a form of spraying, applying, or so on.

As an example, the drying portion 180 may quickly dry the dyeing ink output onto hairs or the coating agent and may be composed of a heater, hot air, and infrared rays. The coating portion 190 may output a coating agent that assists the dyeing ink output onto hairs to be settled well on each hair or may output a nutritional agent containing ingredients for health care of a hair.

Meanwhile, the hair printer 100 may further include a cleaning unit 120 that slidably moves to a capping position for capping the printer head 170 and an uncapping position for dyeing.

For example, the cleaning unit 120 may include a wiping portion that wipes the ink on the printer head 170 while slidably moving in a state in contact with the printer head 170. In other words, the cleaning unit 120 not only serves as a cover to prevent the printer head 170 from being exposed to the outside when not in use, but also removes ink remaining in the printer head 170 through the wiping portion during sliding movement. For example, the number of wiping portions may correspond to the number of printer heads 170 and is not limited thereto.

In detail, when the hair printer 100 is used, the cleaning unit 120 may be slidably moved from the capping position to the uncapping position. At this time, when not in use, the wiping portion may wipe off the ink leaked from the printer head 170. In addition, when use of the hair printer 100 is completed, the cleaning unit 120 may be slidably moved from the uncapping position to the capping position. The wiping portion may wipe off the ink remaining in the printer head 170. For example, the wiping portion may be formed of a porous absorbent material such as a fiber or sponge capable of absorbing ink and is not limited thereto.

The cleaning unit 120 may include a capping portion that comes into close contact with the printer head 170 when the printer head 170 is capped. The capping portion is in close contact with a circumference of the printer head 170, and a central portion thereof is recessed to collect that ink dripping from the printer head 170, and thus, contamination due to ink may be prevented.

In addition, the wiping portion and the capping portion may be replaced as needed when used for a certain period of time. For example, a replacement cycle may be notified by an alarm through an application or by an alarm an apparatus itself.

The cleaning unit 120 may further include an opening/closing sensor for detecting whether the cleaning unit 120 is opened or closed. In addition, a user may check whether the cleaning unit 120 is opened or closed through the display unit 150. For example, when a predetermined time elapses in an uncapping state in which the printer head 170 is opened, the cleaning unit may raise an alarm to a user through the opening/closing sensor to prevent the printing head 170 from being dried.

Figure 6:
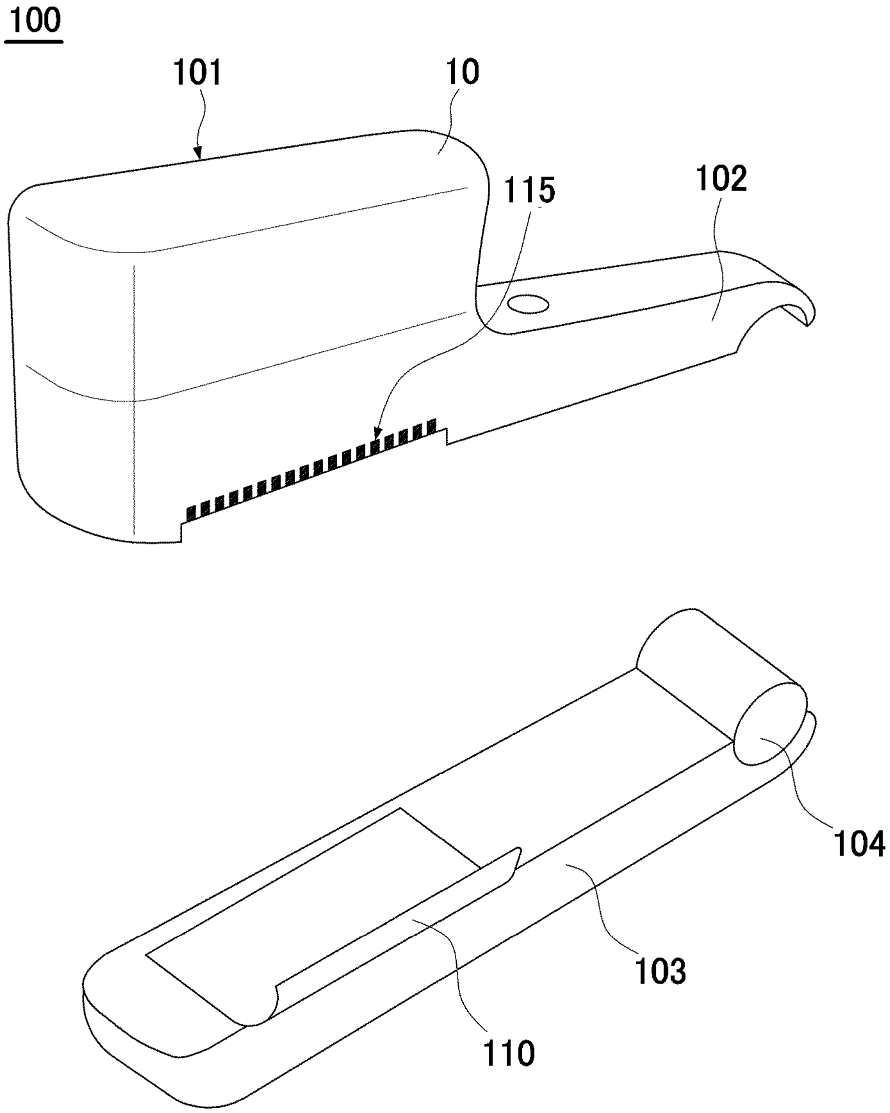
FIG. 6 is a view illustrating a modification example of the portable hair printer according to the embodiment of the present disclosure.

FIG. 6 is a view illustrating a modification example of a portable hair printer according to an embodiment of the present disclosure.

As illustrated in FIG. 6, the upper housing 102 and the lower housing 103 of the portable hair printer 100 may be separated from each other. In addition, if necessary, the upper housing 102 may be combined with and the lower housing 103. For example, the upper housing 102 may be selectively coupled or separated to or from the lower housing 103 through the hinge 104. Through this configuration, the convenience of storage or maintenance of the portable hair printer 100 may be improved.

Figure 7:
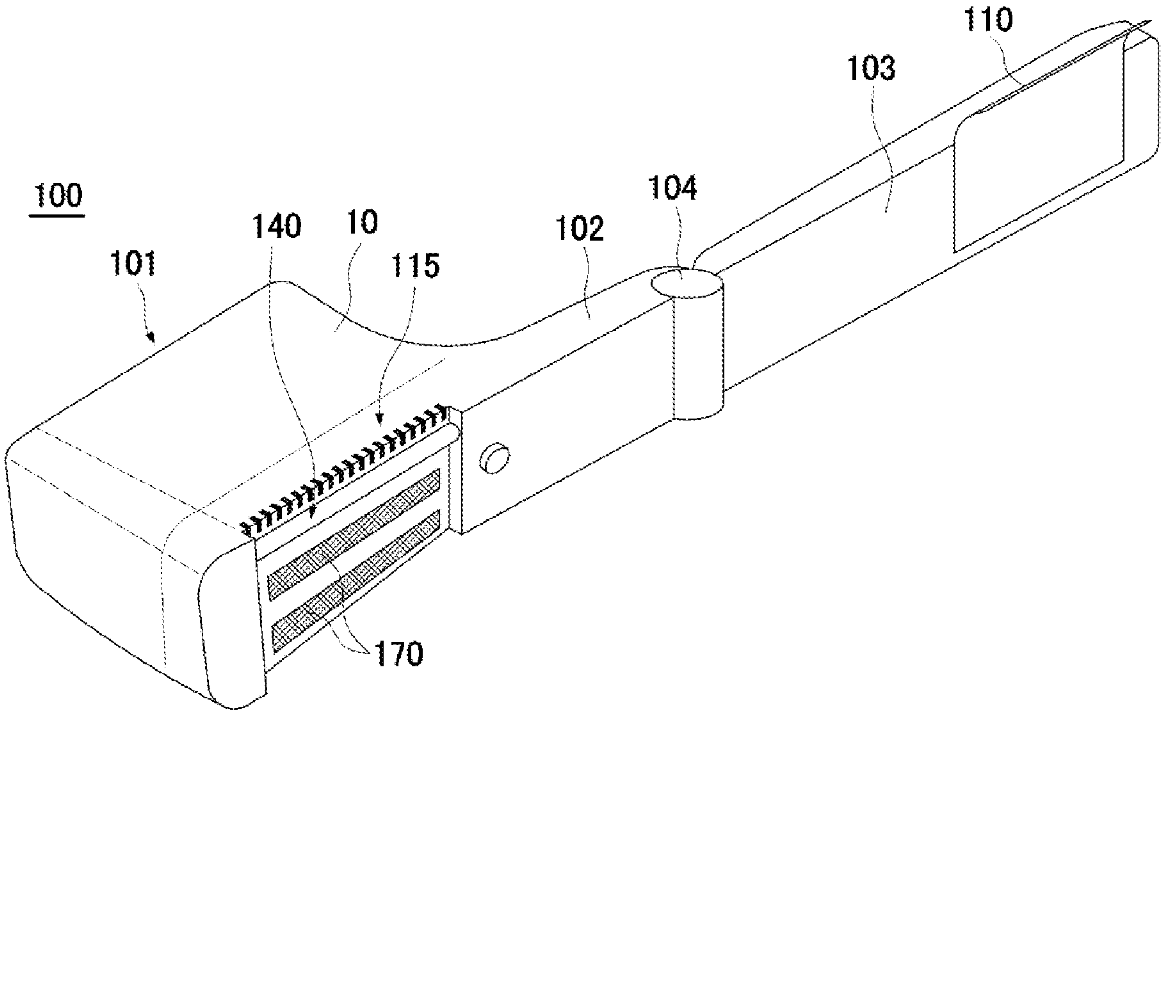
FIG. 7 is a view illustrating another modification example of the portable hair printer according to the embodiment of the present disclosure.

FIG. 7 is a view illustrating another modification example of a portable hair printer according to an embodiment of the present disclosure.

As illustrated in FIG. 7, the upper housing 102 and lower housing 103 of the portable hair printer 100 may be unfolded. For example, through the hinge 104, the upper housing 102 and the lower housing 103 may be folded such that an angle between the upper housing 102 and the lower housing 103 is 0°, the upper housing 102 and the lower housing 103 may be unfolded such that the angle between the upper housing 102 and the lower housing 103 is 180°, or the upper housing 102 and the lower housing 103 may be reversed such that the angle between the upper housing 102 and the lower housing 103 is about 360°. Through this configuration, the convenience of storage or maintenance of the portable hair printer 100 may be improved.

Figure 8:
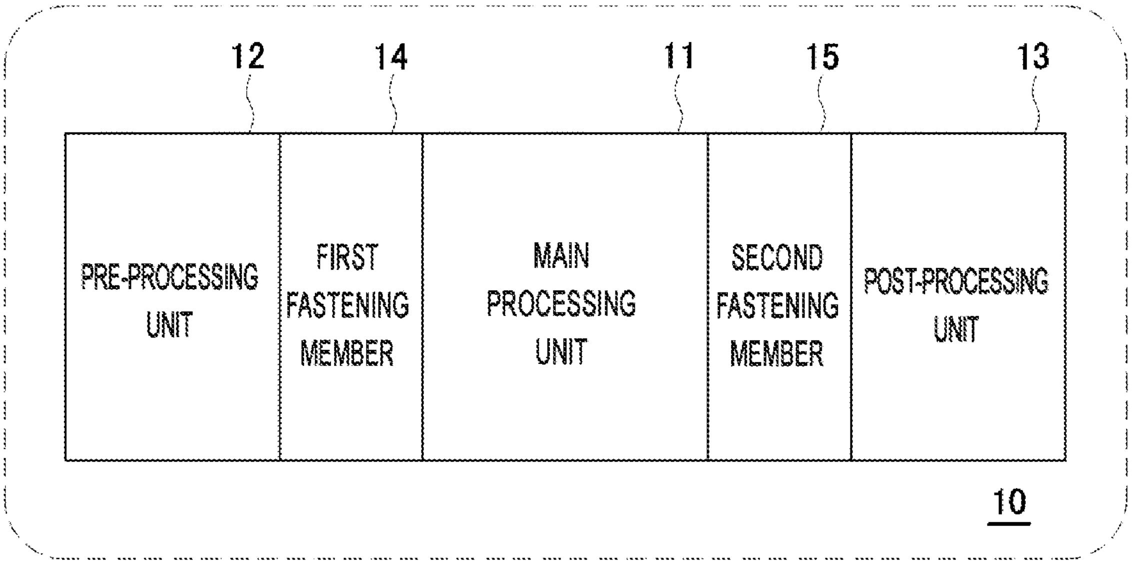
FIG. 8 is a view illustrating another modification example of the portable hair printer according to the embodiment of the present disclosure.

FIG. 8 is a view illustrating another modification example of a portable hair printer according to an embodiment of the present disclosure.

The printer module 10 may include a main processing unit 11, a pre-processing unit 12, and a post-processing unit 13. In addition, the printer module 10 may further include a first fastening member 14 and a second fastening member 15.

The main processing unit 11 is configured to output a color developing material to the hair, which is an object. The pre-processing unit 12 is configured to output a first color development auxiliary material to the object to perform color masking. The post-processing unit 13 is configured to output a second color development auxiliary material to the object to perform color fixation processing. In this case, the main processing unit 11, the pre-processing unit 12, or the post-processing unit 13 outputs a color developing material, and a method of outputting the color developing material includes spraying or applying.

The main processing unit 11 may be selectively attached or detached to or from the pre-processing unit 12 and the post-processing unit 13. In one example, when the main processing unit 11 is formed as a polyhedron, one side of the main processing unit 11 may be coupled to the pre-processing unit 12, and the other side of the main processing unit 11 may be coupled to the post-processing unit 13.

The first fastening member 14 may couple the main processing unit 11 to the pre-processing unit 12. In this case, the first fastening member 14 may be placed on one surface of the main processing unit 11 or one surface of the pre-processing unit 12 or may be placed on both one surface of the main processing unit 11 and one surface of the pre-processing unit 12. For example, the first fastening member 14 may include a fastening groove (not illustrated) and a fastening rod (not illustrated), the fastening groove (not illustrated) may be formed in one surface of the main processing unit 11, and the fastening rod (not illustrated) may be provided on one surface of the preprocessing unit 12. In addition to this, the first fastening member 14 may have various fastening forms.

The second fastening member 15 may couple the main processing unit 11 to the post-processing unit 13. In this case, the second fastening member 15 may be placed on one surface of the main processing unit 11 or one surface of the post-processing unit 13 or may be placed on both one surface of the main processing unit 11 and one surface of the post-processing unit 13. For example, the second fastening member 15 may include a fastening groove (not illustrated) and a fastening rod (not illustrated), the fastening groove (not illustrated) may be formed in one surface of the main processing unit 11, and the fastening rod (not illustrated) may be provided on one surface of the post-processing unit 13. In addition, the second fastening member 15 may have various fastening forms.

The color developing material output by the main processing unit 11 may include a color developing agent, such as ink or paint. The color developing material may have the form of any one of solid, powder, liquid, gel, and gas. The color developing material may be composed of a single component or a composition including a plurality of components, and may have its own color. For example, the color developing material may be color ink or dye, but the scope of the present disclosure is not limited thereto.

The first color development auxiliary material output by the preprocessing unit 12 is for color development and durability improvement, and may have its own color in the form of solid, powder, liquid, gel, or so on depending on the content of wax, gel, and so on or may be a transparent material. The first color development auxiliary material may be composed of a single component or a composition including a plurality of components, and may have its own color or be transparent. For example, the first color development auxiliary material may correspond to a decolorizing agent or a coloring agent, but the scope of the present disclosure is not limited thereto.

More specifically, the first color development auxiliary material may be composed of wax, oil, resin, pigment, or solvent. The first color development auxiliary material may include at least one of wax that maintains a composition's appearance and has viscosity and elasticity, oil for smooth application and feeling of use, resin with excellent adhesion and water resistance, coloring matter (pigment and dye) for masking the color of an object, and a solvents for providing uniform mixing.

When the first color development auxiliary material is formed in a powder form, the first color development auxiliary material may be composed of a coloring matter, silicone oil, a silicone-based film former, or a moisturizer. In this case, the first color development auxiliary material may include at least one of coloring matter (pigment and dye) for masking, silicone oil for providing water resistance and smooth application of the coloring matter, silicone-based film former for increasing water resistance and durability, and a moisturizer for overcoming dryness.

When the first color development auxiliary material is formed in a liquid form, the first color development auxiliary material may be composed of coloring matter, resin, and solvent. When the first color development auxiliary material is oil-based, the solvent may be oil, and the resin may be an oil-soluble resin. In contrast to this, when the first color development auxiliary material is water-based, the solvent may be water, and the resin may be a water-soluble resin.

When the first color development auxiliary material is formed in a gel form, the first color development auxiliary material may further include a gel-forming material.

When the first color development auxiliary material includes coloring matter, the coloring matter may be composed of a component for bright color coating as a color masking to an object. Specifically, the coloring matter may include yellow No. 203, yellow No. 4, yellow No. 5, yellow No. 201, yellow No. 204, organic pigment and pearl pigment of barium or aluminum lake, vegetable natural pigment, coating luster pigment, titanium oxide coating, muscovite, synthetic mica, sericite, titanium dioxide, titanium oxide coated mica, aluminum powder, iron sulfate, barium sulfate, silica and zeolite, tin oxide, zinc oxide, aluminum oxide, silicon dioxide, zirconium oxide, inorganic powder such as silver(I) oxide, gold, and silver, natural dye, organic dye, or a combination thereof but is not limited thereto. For example, aluminum lake pigment may be attached onto an object to mask an original color and cause a bright color, such as white or blonde, to be displayed. The content of the pigment may be about 1 to 60% by weight with respect to the entire first color development auxiliary material.

When the first color development auxiliary material includes a resin, the resin provides adhesion and water resistance to the coloring matter. The resin may be made of a polymer including one or more of ethyl cellulose, propyl cellulose, vinyl ester copolymer, acrylate, dimethylsiloxane, cyclopentasiloxane, polyacrylic acid, sodium polyacrylate, partially neutralized polyacrylic acid, polyacrylic acid starch, carmellose sodium, carboxyvinyl polymer, N-Vinyl acetate/amide copolymer, polyurethane, polyester urethane, carboxymethylcellulose, methylcellulose, ethylcellulose, hydroxypropylcellulose, hydroxypropylmethylcellulose, hydroxyethylcellulose, polyvinylpyrrolidone, polyvinyl alcohol, polyvinylacetoacetal, polyvinyl butyral, polyquaternium-28, polyquaternium-11, acrylate/dimethyl silicone copolymer, vinyl acetate/vinylpyrrolidone monomer copolymer, vinylpyrrolidone/dimethylamino ethyl, methacrylate copolymer, styrene/acrylate copolymer, acrylate/ethylhexyl acrylate copolymer, dextrin isostearate, methacryloylethyl betaine/acrylate copolymer, AMP/acrylate copolymer, cellulose acetate formate, cellulose acetate propionate, and cellulose acetate butyrate. The resin may include, for example, an acrylate/dimethyl silicone copolymer or so on, and various other resins may be used. The content of the resin may be about 1 to 40% by weight with respect to the entire first color development auxiliary material.

When the first color development auxiliary material includes wax, the wax may maintain a solid shape and ensuring stability of contents at a high temperature to prevent the wax from flowing down during use. The wax may include, for example, candelilla wax, carnauba wax, ceresin, polyethylene wax, carnauba wax, lanolin, paraffin, shea butter, beeswax, olive wax, candelilla wax, wood wax, cacao butter, microcrystal wax, ceresin wax, cuppu. Acoustic butter, spermaceti, perm oil, polyethylene wax, microcrystalline wax, amide wax, ester wax, oxidized wax, ozokerite, montan wax, Japan wax, cocoa butter, synthetic wax, or a combination thereof but is not limited thereto. The content of the wax may be about 1 to 50% by weight with respect to the entire first color development auxiliary material of a solid type.

When the first color development auxiliary material includes oil, the oil may provide a smooth application and feeling of use. The oil may include, for example, mineral oil such as liquid paraffin, animal oil such as squalene or hydrosqualene, vegetable oil such as palm oil, avocado oil, jojoba oil, sesame oil, olive oil, or castor oil, or synthetic oil such as butyl myristate, isopropyl myristate, cetyl myristate, isopropyl palmitate, butyl stearate, polybutene, polyisobutene, hydrogenated polyisobutene, various polyols, tri-2-ethylhexyl glycerin, triglyceride oil, myristyl lactate, or octyl dodecanol and diisostearyl malate but is not limited thereto. The content of the oil may be about 1 to 30% by weight with respect to the entire first color development auxiliary material.

A solvent for the first color development auxiliary material may include distilled water, diethylene glycol butyl ether, ethylene glycol, propylene glycol, polyethylene glycol, glycerin, oleyl alcohol, butylene glycol dimethylsiloxane, cyclopentasiloxane, ethyl alcohol, n-propyl alcohol, isopropyl alcohol, n-butyl alcohol, sec-butyl alcohol, t-butyl alcohol, isobutyl alcohol, ethyl lactate, diethylene glycol, triethylene glycol, dipropylene glycol butylene glycol, 1,4-butanediol, 1,2,4-butanetriol, 1,5-pentanediol, 1,6-hexanediol, 1,2-hexanediol, 1,2,6-hexanetriol, hexylene glycol, glycerol ethoxylate, trimethylolpropane ethoxylate, sodium 2-pyrrolidone-5-carboxylate, methyl pyrrolidone, caprylyl pyrrolidone, etriol, ethylene glycol monomethyl ether, ethylene glycol monoethyl ether, diethylene Glycol methyl ether, diethylene glycol ethyl ether, triethylene glycol monomethyl ether, triethylene glycol monoethyl ether, dimethyl sulfoxide, tetramethylene sulfone, thioglycol, methylcarbitol, ethylcarbitol, propylcarbitol, butylcarbitol, alkyl cellosolve, dipropylene glycol alkyl ether, carbitol monoalkyl acetate, propylene glycol monoalkyl ether, ethylene carbonate, propylene carbonate, butanol, pentanol, hexanol, 2-etherhexanol, or a combination thereof but is not limited thereto. Among the above compounds, alkyl may be, for example, methyl, ethyl, propyl, butyl, pentyl, hexyl, or so on. The content of a solvent may be about 1 to 90% by weight with respect to the entire first color development auxiliary material.

When the first color development auxiliary material includes silicone oil, the silicone oil may provide basic water resistance, nutritious application, and a non-sticky completeness for the composition. The silicone oil may include, for example, dimethicone, dimethiconol, dimethicone, phenylmethicone, phenyltrimethicone, PEG-12 dimethicone, cyclopentasiloxane, methyltrimethicone, cyclohexasiloxane, prilyltrimethicone, lauryl trimethicone, caprylyl methicone, phenyl trimethicone, diphenyl dimethicone, dimethicone, dimethicone/vinyl dimethicone crosspolymer, or so on but is not limited thereto. The content of the silicone oil may be about 1 to 30% by weight with respect to the entire powdered first color development auxiliary material.

When the first color development auxiliary material includes a silicone-based film former, the silicone-based film former is used to increase water resistance and sustainability of the first color development auxiliary material of a powder type. For example, the silicone-based film former may include trimethylsiloxysilicate, bishydroxylauryldimethicone/ipdiicopolymer, silica silylate, or so on but is not limited thereto. The content of the silicone-based film former may be about 1 to 40% by weight with respect to the entire powder-type first color development auxiliary material.

When the first color development auxiliary material includes a moisturizer, the moisturizer removes dryness and may reduce the feeling of foreign matter or matte feeling of a powder composition. For example, the moisturizer may include glycerin, glucose, 1,3-butylene glycol, ethylene glycol, diethylene glycol, triethylene glycol, ethylene glycol monoethyl ether, propylene glycol, 1,3 butylene glycol, hexylene glycol, polyethylene. Glycol, sorbitol, mannitol collagen, hyaluronic acid, sodium PCA, evening primrose oil, borage oil, jojoba oil, aloe vera gel, vitamin F, panthenol, sodium lactate, sodium 2-pyrrolidone-5-carboxylate, sodium hyaluronate, a mixture thereof, or so on but is not limited thereto. The content of the moisturizer may be about 1 to 30% by weight with respect to the entire first color development auxiliary material.

When the first color development auxiliary material includes a preservative, the preservative may prevent deterioration dur to microorganisms. The preservative may include 1,2-hexanediol, propylene glycol, butylene glycol, caprylyl glycol, glyceryl caprylate, p-anisic acid, pentylene glycol, ethylhexyl glycerin, napri, Eco. Examples include free, phenoxyethanol, imidazolidiniurea, tricrosan, ethanol, salicylic acid, or so on but is not limited thereto. The content of the preservative may be about 1 to 30% by weight with respect to the entire first color development auxiliary material.

When the first color development auxiliary material includes a gel-forming material, the gel-forming material may reduce fluidity and maintain appropriate viscosity. The gel-forming material may include, for example, xanthan gum, tragang gum, guar gum, carrageenan, cellulose gum, carbopol, hydroxyethylcellulose, hydroxymethylcellulose, hydroxypropylcellulose, pectin, starch, agar, gelatin, or so on but is not limited thereto. The content of the gel-forming material may be about 1 to 30% by weight with respect to the entire first color development auxiliary material of a gel type.

In addition to this, the first color development auxiliary material may include ingredients contained in a general cosmetic composition, such as other powders, nutrient, volatile solubilizer, antioxidant, surfactant, emulsifier, fragrance, and so on in addition to the above-described active ingredients within a range that does not impair effects of the present disclosure. The above ingredients may be included therein by an amount of 1 to 60% by weight with respect to a total weight of the composition.

The second color development auxiliary material output by the post-processing unit 13 may be for color fixation and durability improvement after color application by the main processing unit 11 and may also be formed of one of solid, powder, liquid, gel, and gas. The second color development auxiliary material may be composed of a single component or a composition including a plurality of components and may have its own color or be transparent. For example, the second color development auxiliary material may correspond to a coating agent, but the scope of the present disclosure is not limited thereto.

The second color development auxiliary material may essentially include a film former and a solvent and may optionally include a preservative. That is, the second color development auxiliary material may include a film former and a solvent or may include a film former, a solvent, and a preservative. More specifically, the second color development auxiliary material may be composed of a film former with excellent adhesion and water resistance, a solvent for uniform mixing and viscosity control, and a preservative for preventing corruption due to microorganisms.

The film former may be used to fix color and improve durability. For example, the film former may be made of a polymer including one or more units of trimethylsiloxysilicate, bishydroxylauryldimethicone/IPDIicopolymer, ethyl cellulose, propyl cellulose, vinyl ester copolymer, acrylate, dimethylsiloxane, cyclopentasiloxane, and polyacrylic acid, sodium polyacrylate, partially neutralized polyacrylic acid, polyacrylic acid starch, carmellose sodium, carboxyvinyl polymer, N-vinylacetate/amide copolymer, polyurethane, polyester urethane, carboxymethylcellulose, methylcellulose, ethylcellulose, hydroxypropylcellulose, hydroxypropylmethylcellulose, hydroxyethylcellulose, polyvinylpyrrolidone, polyvinyl alcohol, polyvinylacetoacetal, polyvinylbutyral, polyquaternium-28, polyquaternium-11, acrylate/dimethyl silicone copolymer, vinyl acetate/vinylpyrrolidone monomer copolymer, vinylpyrrolidone/dimethylamino ethyl methacrylate copolymer, styrene/acrylate copolymer, acrylate/ethylhexyl acrylate copolymer, dextrin isostearate, methacryloylethyl betaine/acrylate copolymer, AMP/acrylate copolymer, cellulose acetate formate, cellulose acetate propionate, and cellulose acetate butylate. In addition, various film formers may be used. The content of the film former may be about 1 to 50% by weight with respect to on the entire second color development auxiliary material.

The solvent may include distilled water, diethylene glycol butyl ether, ethylene glycol, propylene glycol, polyethylene glycol, glycerin, oleyl alcohol, butylene glycol dimethylsiloxane, cyclopentasiloxane, ethyl alcohol, n-propyl alcohol, and isopropyl alcohol, n-butyl alcohol, sec-butyl alcohol, t-butyl alcohol, isobutyl alcohol, ethyl lactate, diethylene glycol, triethylene glycol, dipropylene glycol butylene glycol, 1,4-butanediol, 1,2,4-butanetriol, 1,5-pentanediol, 1,6-hexanediol, 1,2-hexanediol, 1,2,6-hexanetriol, hexylene glycol, glycerol ethoxylate, trimethylolpropane ethoxyl latex, Sodium 2-pyrrolidone-5-carboxylate, methyl pyrrolidone, caprylyl pyrrolidone, etriol, ethylene glycol monomethyl ether, ethylene glycol monoethyl ether, diethylene glycol methyl ether, diethylene glycol ethyl ether, triethylene glycol monomethyl ether, triethylene glycol monoethyl ether, dimethyl sulfoxide, tetramethylene sulfone, thioglycol, methylcarbitol, ethylcarbitol, propylcarbitol, butylcarbitol, alkyl cellosolve, dipropylene glycol alkyl ether, carbitol monoalkyl acetate, propylene glycol monoalkyl ether, ethylene carbonate, propylene carbonate, butanol, pentanol, hexanol, 2-etherhexanol, or a combination thereof but is limited thereto. The content of the solvent may be about 1 to 90% by weight with respect to the entire second color development auxiliary material.

The preservatives may include 1,2-hexanediol, propylene glycol, butylene glycol, caprylyl glycol, glyceryl caprylate, p-anisic acid, pentylene glycol, ethylhexylglycerin, and napri, ecofree, phenoxyethanol, imidazolidiniurea, tricrosan, ethanol, salicylic acid, or so on but is not limited thereto. The content of the preservative may be about 1 to 30% by weight with respect to the entire second color development auxiliary material.

Hereinafter, the first color development auxiliary material and the second color development auxiliary material according to an embodiment of the present disclosure are described in detail. In order to perform temporary hair dyeing, first, color masking (application and fixation of a bright color) is performed on an object by using the first color development auxiliary material, a predetermined color development agent is applied to the object (dyeing, tattooing, nail art, and make-up), and performs post-processing (heat treatment, and so on) to fix the color.

Hereinafter, an example of manufacturing the first color development auxiliary material is described.

Example 1

3 g of candelilla wax, 2 g of beeswax, 10 g of shea butter, and 20 g of butylcarbitol were put into a container, stirred at 90° C. to be completely dissolved, and 7 g of polyvinylpyrrolidone and 10 g of polyquaternium-11 were slowly added thereto to be completely dissolved with a homogenizer to prepare a homogeneous phase and then were cooled to 50° C. In addition, 5 g of 1,2-hexanediol, 10 g of isopropyl alcohol, 20 g of titanium dioxide, and 10 g of aluminum powder were additionally put into the container and cooled to 25° C. while stirring with a homogenizer to prepare a solid first color development auxiliary material.

Example 2

5 g of nano silica, 20 g of pearl pigment, 5 g of butylene glycol, 15 g of glycerin, 25 g of pentanol, and 5 g of polyvinyl butyral were put into a container, stirred for 30 minutes, and dispersed by using a bead mill. The prepared dispersed liquid was filtered by a filter of 1 um, and then 20 g of AMP acrylate and 5 g of pentylene glycol were additionally put into the container and stirred with a homogenizer to prepare the first color development auxiliary material of a uniform liquid type.

Example 3

A first process was performed in which 40 g of yellow No. 4, 5 g of dimethicone, 10 g of caprylyl methicone, and 5 g of cyclopentasiloxane were put into a Henschel mixer, dispersed and mixed twice at a speed of 1,200 rpm, and pulverized, and a second process was performed in which the coloring matter mixed and pulverized in the first process were dispersed and mixed with 25 g of trimethylsiloxysilicate, 10 g of collagen, and 5 g of aloe by heating to 70 to 80° C., and thereby, the first color expression auxiliary material of a powder type was prepared.

Example 4

10 g of zinc oxide, 20 g of silicon dioxide, 5 g of ethyl cellulose, 10 g of styrene/acrylate copolymer, 5 g of ethylene glycol, and 10 g of methyl carbitol were put into a container, stirred for 30 minutes, and then dispersed with a bead mill. A first process of preparing a dispersed liquid was performed by filtering the prepared dispersed liquid by using a filter of 1 um. In addition, 10 g of xanthan gum and 30 g of distilled water were additionally put into the container and stirred at 60° C. to be completely dissolved, and then the dispersed liquid prepared in the first process was added thereto, stirred with a homogenizer, and cooled to 25° C., and thereby, the first color development auxiliary material of a gel-type was prepared.

Hereinafter, an example of manufacturing the second color development auxiliary material is described.

Example 5

25 g of polyurethane, 30 g of isopropyl alcohol, 40 g of ethanol, and 5 g of 1,2-hexanediol were put into a container, and mixed uniformly, and thereby, a second color development auxiliary material was prepared.

Example 6

After a homogeneous phase was prepared by using 30 g of polyquaternium-28 and 40 g of distilled water with a homogenizer, 20 g of isobutyl alcohol and 10 g of 1,2-hexanediol were added thereto and mixed uniformly to prepare the second color development auxiliary material was prepared.

Example 7

20 g of polyvinylacetoacetal, 50 g of hexylene glycol, and 30 g of propylene glycol were put into a container, and a homogeneous phase was prepared with a homogenizer to prepare the second color development auxiliary material.

Example 8

15 g of polyester urethane, 45 g of thioglycolethanol, 20 g of pentylene glycol, and 20 g of cellulose gum were stirred at 70° C. for 1 hour, and the uniformly prepared mixture was cooled to 25° C. to prepare the second color development auxiliary material of a gel-type.

The color development, durability improvement, and water resistance of an object were evaluated by processing black human hair by using a detachable device auxiliary device according to an embodiment of the present disclosure and the composition of examples 1 to 8.

In order for the main processing unit to perform a color developer application of the first color development auxiliary material according to Examples 1 to 4, the pre-processing unit 12 performed color masking (application and fixation of bright color) on an object, the main processing unit 11 performs a procedure of applying a predetermined color developer to the object, and the post-processing unit 13 performed application of a composition for color fixation and post-processing (heat treatment and so on), and thereby, durability was improved.

Color Development Evaluation

Red coloring matter (D&C RED 28) is output onto human hair by the main processing unit of the present disclosure. The optical density (OD) of dyed human hair was measured by using a spectroeye (GretagMacbeth company), which is a colorimetric densitometer, and evaluated according to the following standard, and the results are shown in Table 1 below. In spectroscopy, the optical density (OD) refers to a log value of a ratio (I0/I1) of the amount (I0) of emitted radiation to the amount of transmitted radiation (I1) when energy such as light is emitted onto a material.

By measuring the optical density, color vividness, which includes both brightness and saturation of a color, may be measured as an objective indicator, and accordingly, the objective indicator may be used as a standard for evaluating color development when dyeing hair.

Good (o): OD>0.7
Normal (Δ): 0.5≤OD<0.7
Defective (x): OD<0.5

TABLE 1

| | Evaluation example 1 | Evaluation example 2 | Evaluation example 3 | Evaluation example 4 | Evaluation example 5 | Evaluation example 6 | Evaluation example 7 | Evaluation example 8 |
|---|---|---|---|---|---|---|---|---|
| Pre-processing/Post-processing | Example 1/ Example 5 | Example 2/ Example 5 | Example 3/ Example 6 | Example 4/ Example 7 | Example 4/ Example 8 | Example 4/ — | —/ Example 7 | Only main processing —/— |

TABLE 1-continued

| | Evaluation example 1 | Evaluation example 2 | Evaluation example 3 | Evaluation example 4 | Evaluation example 5 | Evaluation example 6 | Evaluation example 7 | Evaluation example 8 |
|---|---|---|---|---|---|---|---|---|
| OD value | 0.76 | 0.82 | 0.95 | 0.79 | 0.93 | 0.7 | 0.29 | 0.29 |
| evaluation | ○ | ○ | ○ | ○ | ○ | ○ | x | x |

Referring to Table 1, in Evaluation Examples 1 to 5, OD values are all 0.7 or greater, resulting in excellent hair color development, and thus, a target color is implemented. However, in Evaluation Examples 7 and 8, OD values are less than 0.7, resulting in insufficient hair color development.

Water Resistance Evaluation

In Evaluation Examples 1 to 8, a printed portion of the hair was immersed in water for 5 minutes, taken out, dried completely, and measured OD (OD wet), and then a percentage of the measured OD ($OD_{before}$) was measured before immersed in water and was evaluated according to the following criteria, and the results are shown in Table 2 below.

$A=(OD_{wet}/OD_{before})\times 100(\%)$

Good (o): A>90

Normal (Δ): 70≤A<90

Defective (x): A<70

TABLE 2

| | Evaluation example 1 | Evaluation example 2 | Evaluation example 3 | Evaluation example 4 | Evaluation example 5 | Evaluation example 6 | Evaluation example 7 | Evaluation example 8 |
|---|---|---|---|---|---|---|---|---|
| Pre-processing/Post-processing | Example 1/ Example 5 | Example 2/ Example 5 | Example 3/ Example 6 | Example 4/ Example 7 | Example 4/ Example 8 | Example 4/ — | —/ Example 7 | Only main processing —/— |
| $OD_{before}$ | 0.76 | 0.82 | 0.95 | 0.79 | 0.93 | 0.7 | 0.29 | 0.29 |
| $OD_{wet}$ | 0.71 | 0.78 | 0.89 | 0.73 | 0.86 | 0.3 | 0.25 | 0.12 |
| Value A | 93 | 95 | 94 | 92 | 93 | 42 | 86 | 41 |
| Evaluation | ○ | ○ | ○ | ○ | ○ | x | Δ | x |

Referring to Table 2, it can be seen that Evaluation Examples 1 to 5 have excellent water resistance because a difference in hair color development before and after soaking in water is less than in Evaluation Examples 6 to 8.

Abrasion Resistance Evaluation

In Evaluation Examples 1 to 8, the printed portion of the hair was rubbed five times to measure the OD ($OD_{abbr}$), a percentage of the OD ($OD_{before}$) measured before rubbing was calculated and evaluated according to the following criteria, and the results are shown in Table 3 below.

$B=(OD_{abbr}/OD_{before})\times 100(\%)$

Good (o): B>90

Normal (Δ): 70≤B<90

Defective (x): B<70

TABLE 3

| | Evaluation example 1 | Evaluation example 2 | Evaluation example 3 | Evaluation example 4 | Evaluation example 5 | Evaluation example 6 | Evaluation example 7 | Evaluation example 8 |
|---|---|---|---|---|---|---|---|---|
| Pre-processing/Post-processing | Example 1/ Example 5 | Example 2/ Example 5 | Example 3/ Example 6 | Example 4/ Example 7 | Example 4/ Example 8 | Example 4/ — | —/ Example 7 | Main processing only —/— |
| $OD_{before}$ | 0.76 | 0.82 | 0.95 | 0.79 | 0.93 | 0.7 | 0.29 | 0.29 |
| $OD_{abbr}$ | 0.71 | 0.78 | 0.86 | 0.73 | 0.86 | 0.3 | 0.24 | 0.23 |
| Value B | 93 | 95 | 91 | 92 | 93 | 42 | 82 | 79 |
| Evaluation | ○ | ○ | ○ | ○ | ○ | x | Δ | Δ |

Referring to Table 3, it can be seen that Evaluation Examples 1 to 5 have excellent abrasion resistance because a difference in hair color before and after rubbing the hair is less than in Evaluation Examples 6 to 8.

Hereinafter, a hair printing method using the portable hair printer 100 according to the present disclosure will be described. Hereinafter, description on a configuration of performing the same function among the configurations illustrated in FIGS. 1 to 5 described above will be omitted.

Figure 9:
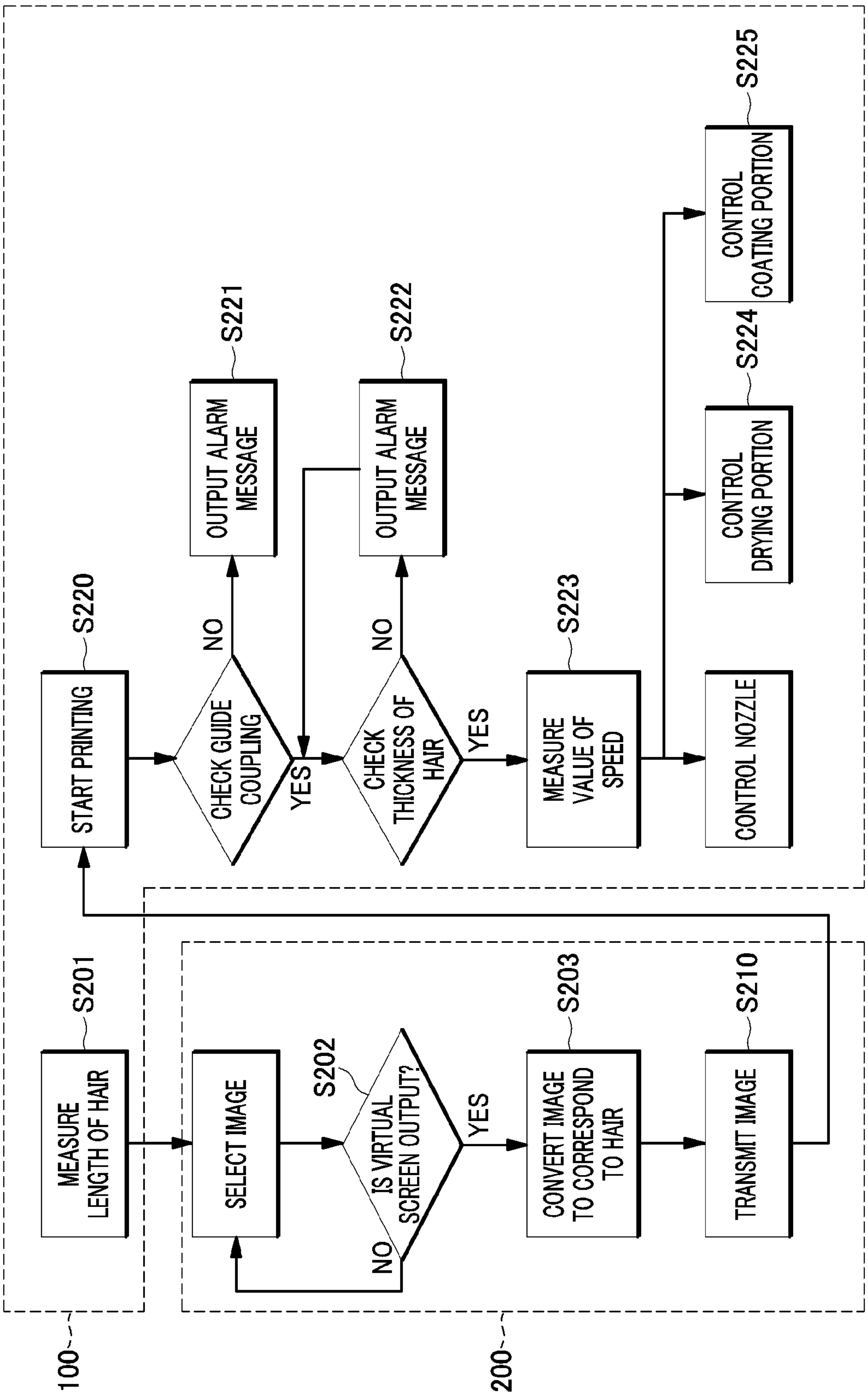
FIG. 9 is a flowchart illustrating a hair printing method using the portable hair printer, according to another embodiment of the present disclosure.

FIG. 9 is a flowchart illustrating a hair printing method using a portable hair printer, according to an embodiment of the present disclosure.

Referring to FIG. 9, the hair printing method using the portable hair printer 100 includes step S210 of receiving an image to be dyed on hairs from the user terminal 200 through the communication module 20 by the portable hair printer 100 and step S220 of performing an image printing operation for the hairs by transmitting the received image to the printer module 10 included in the portable hair printer 100.

Specifically, the method may further include step S201 of calculating a length of a bundle of hairs based on a value measured through the sensor module 40 for detecting a movement state of the portable hair printer 100 as the portable hair printer 100 moves along the hairs while the hairs are gripped by using the upper housing 102 and the lower housing 103 of the portable hair printer 100 before step S210 of receiving an image is performed.

In addition, the method may further include step S202 of imaging or receiving a hair image of a person to be dyed by the user terminal 200, synthesizing a hair image and an image to be dyed which size is converted and provide it to the user terminal S200 before step S210 of receiving the image is performed.

For example, when a user selects an image to be dyed through the user terminal 200 after step S201, a virtual screen having an image converted in size to correspond to a length of a bundle of hairs of a user may be output and an image may be selected again by the user or image determination may be completed (S202). The user-determined image (that is, the image received in step S210) may be converted in size by the user terminal 200 to correspond to a length of a bundle of hairs, based on the length of the bundle of hairs calculated in step S201 (S203).

In step S220 of performing a printing operation, when a size of a bundle of hairs measured by the hair measurement sensor 130 that measures the size of a bundle of hairs gripped is greater than or equal to a threshold while the hairs are gripped between the upper housing 102 and the lower housing 103 of the portable hair printer 100, an alarm may be output to cause the hairs to be gripped again (S222).

For example, before step S222 is performed, whether the comb member 115 and the hair guide 110 are coupled to each other is checked while hairs are gripped between the comb member 115 disposed on a side surface of the upper housing 102 and the hair guide 110 disposed on a side surface of the lower housing 103, and when the hairs are not coupled such that the hairs are evenly introduced, an alarm may be output to cause the hairs to be gripped again (S221).

Then, the portable hair printer 100 may collect information on a movement state of the hair printer 100 on hairs, based on a value measured by the sensor module 40 that detects the movement state of the portable hair printer 100 as the portable hair printer 100 moves along the hairs, and adjust an output state of an image in synchronization with the collected information (S223).

Specifically, in step S223, the sensor module 40 may check a movement speed or a movement distance from a starting point by detecting a rotation speed of the rotation roller 140 coupled to the hair printer 100, and adjust the output state of the image in synchronization with the movement speed or the movement distance.

Step S220 may include step S224 of outputting a coating agent before and after dyeing ink is ejected through the coating portion 190 disposed adjacent to the printer module 10 and step S225 of drying the dyeing ink or the coating agent through the drying portion 180 disposed adjacent to the coating portion 190.

Meanwhile, the embodiment of the present disclosure may also be implemented in the form of a recording medium including instructions that is executable by a computer, such as a program module executed by a computer. Computer readable media may be any available media that may be accessed by a computer and include all of volatile and nonvolatile media, and removable and non-removable media. In addition, the computer readable media may include computer storage media. The computer storage media includes all of volatile and nonvolatile media, and removable and non-removable media which are implemented by any method or technology for storing information such as computer readable instructions, data structures, program modules or other data.

The above description of the present disclosure is for illustration only, and those skilled in the art to which the present disclosure belongs will understand that modifications to other specific forms may be easily made without changing the technical ideal or essential features of the present disclosure. Therefore, it should be understood that the embodiments described above are illustrative in all respects and not restrictive. For example, each configuration element described as a single type may be implemented in a distributed manner, and similarly, configuration elements described as distributed may be implemented in a combined form.

It should be construed that the scope of the present disclosure is indicated by the following claims rather than the above detailed description, and all the changed or modified forms derived from the meaning and scope of the claims and their equivalent concepts are included in the scope of the present disclosure.

What is claimed is:

1. A portable hair printer comprising:
a communication module;
a printer module that performs a printing operation;
a memory that stores a program for printing an image on a surface of a bundle of hairs; and
a processor that executes the program,
wherein the program is executed by the processor, receives an image to be dyed on the bundle of hairs from the user terminal through the communication module, and transmits the received image to the printer module to perform an image printing operation for the bundle of hairs,
wherein the portable hair printer further comprises a housing having the communication module, the printer module, the memory, and the processor embedded therein,
wherein the housing includes an upper housing and a lower housing hinged to each other around a hinge,
wherein a printer head of the printer module is exposed at one end of the upper housing,
wherein the bundle of hairs is gripped between the upper housing and the lower housing as the upper housing and the lower housing approach each other.

2. The portable hair printer of claim 1, further comprising:
a sensor module for detecting a movement state of the portable hair printer on the bundle of hairs,
wherein the program adjusts an output state of the image in synchronization with information on the movement state of the portable hair printer on the bundle of hairs.

3. The portable hair printer of claim 2,
wherein the sensor module is disposed in a position adjacent to a printer head of the upper housing and measures information on a movement speed of the portable hair printer on the hair or a movement distance from the image printing start point.

4. The portable hair printer of claim 2,
wherein the program calculates a length of the bundle of hairs based on a value measured by the sensor module as the portable hair printer moves along the bundle of hairs while the bundle of hairs is gripped between the upper housing and the lower housing of the portable hair printer, and outputs a value of the length of the bundle of hairs on a display unit coupled to the portable hair printer or transmits the value of the length of the bundle of hairs to the user terminal.

5. The portable hair printer of claim 1, wherein
the upper housing is selectively coupled to or separated from the lower housing, and
the upper housing and the lower housing are folded, unfolded, or reversely folded with respect to the hinge.

6. The portable hair printer of claim 1, further comprising:
a hair guide that is disposed on a side surface of the lower housing in an extension direction of the lower housing in a region corresponding to the printer head of the upper housing, and guides introduction of the bundle of hairs.

7. The portable hair printer of claim 1, further comprising:

a comb member that is disposed on a side surface of the upper housing in an extension direction of the upper housing in a region corresponding to the printer head of the upper housing, and guides the bundle of hairs to be evenly introduced.

8. The portable hair printer of claim 7, wherein the comb member is selectively attached to or detached to or from a side of the upper housing.

9. The portable hair printer of claim 1, further comprising:

a hair measurement sensor for measuring a size of the gripped bundle of hairs while the bundle of hairs is gripped between the upper housing and the lower housing, wherein the hair measurement sensor is a thickness measurement sensor for measuring a thickness of the bundle of hairs while the bundle of hairs is gripped between the upper housing and the lower housing, and wherein the program raises an alarm when the size of the bundle of hairs measured by the hair measurement sensor is greater than or equal to a threshold, such that the bundle of hairs is gripped again.

10. The portable hair printer of claim 1, further comprising:

a coating portion that is disposed adjacent to the printer head of the upper housing and outputs a coating agent before and after dyeing ink is ejected; and a drying portion that dries the dyeing ink or the coating agent.

11. The portable hair printer of claim 10, wherein the dyeing ink includes a pigment or dye as a colorant and includes one of a nonionic surfactant and an ionic surfactant.

12. The portable hair printer of claim 1, further comprising:

an ink tank that supplies dyeing ink to the printer module; and a tube that transmits ink of the ink tank to the printer module.

13. The portable hair printer of claim 1, wherein an ink tank that supplies dyeing ink to the printer module is included in the upper housing.

14. The portable hair printer of claim 1, further comprising:

a display unit that displays an operation state of the portable hair printer.

15. The portable hair printer of claim 1, wherein the printer module includes a main processing unit that outputs a color developing material to an object, and include one of a pre-processing unit that is selectively attachable to or detachable from the main processing unit and a post-processing unit that is selectively attachable to or detachable from the main processing unit, the preprocessing unit outputs a first color development auxiliary material to the object to perform color masking, and the post-processing unit outputs a second color development auxiliary material to the object and performs color fixation.

16. A hair printing method using a portable hair printer, the method comprising:

measuring a length of hair by moving the portable hair printer along the hair by an upper housing and a lower housings of the portable hair printer in a state where the hair is held;

receiving an image to be dyed on a bundle of hairs from a user terminal through a communication module by using the portable hair printer; and transmitting the received image to a printer module included in the portable hair printer to perform an image printing operation for the bundle of hairs, wherein the received image's size is converted by the user terminal to correspond to the length of the bundle of hairs, based on the length of the bundle of hairs.

17. The hair printing method of claim 16, wherein, in the measuring of the length of the hair, the length of the hair is measured based on a value measured by a sensor module that detects a movement state of the portable hair printer.

18. The hair printing method of claim 16, further comprising:

imaging or receiving a hair image of a person to be dyed by the user terminal, synthesizing the hair image and the image to be dyed which size is converted and provide it to the user terminal, before the receiving of the image is performed.

19. The hair printing method of claim 16, wherein, in performing the image printing operation, information on a movement state of the hair printer on the bundle of hairs is collected based on a value measured by a sensor module for detecting the movement state of the portable hair printer as the portable hair printer moves along the bundle of hairs, and an output state of the image is adjusted in synchronization with the collected information.

20. The hair printing method of claim 16, wherein, in performing the image printing operation, when a size of the bundle of hairs measured by a hair measurement sensor which measures a size of the bundle of hairs gripped between the upper housing and the lower housing of the portable hair printer is greater than or equal to a threshold, an alarm is raised to grip the bundle of hairs again.

21. The hair printing method of claim 16, wherein the performing of the image printing operation includes outputting a coating agent before and after dyeing ink is ejected through a coating portion disposed adjacent to the printer module, and drying the dyeing ink or the coating agent through a drying portion disposed adjacent to the coating portion.

* * * * *